US011054629B1

(12) United States Patent
Sheydayi et al.

(10) Patent No.: US 11,054,629 B1
(45) Date of Patent: Jul. 6, 2021

(54) NIGHTVISION WITH INTEGRATED MICRO-DISPLAY MODULE

(71) Applicant: L3Harris Technologies, Inc., Melbourne, FL (US)

(72) Inventors: Alexei Sheydayi, Gilbert, AZ (US); James Remus, Phoenix, AZ (US); Jon Burnsed, Tempe, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 16/746,303

(22) Filed: Jan. 17, 2020

(51) Int. Cl.
*G02B 23/12* (2006.01)
*G09G 5/10* (2006.01)
*H04N 5/33* (2006.01)

(52) U.S. Cl.
CPC ............. *G02B 23/125* (2013.01); *G09G 5/10* (2013.01); *H04N 5/33* (2013.01); *G09G 2360/141* (2013.01)

(58) Field of Classification Search
CPC ...... G09G 5/10; G09G 2360/141; H04N 5/33; G02B 23/125
See application file for complete search history.

(56) References Cited

U.S. PATENT DOCUMENTS

| 4,915,487 A | 4/1990 | Riddell et al. |
| 7,053,928 B1* | 5/2006 | Connors ................ G02B 23/12 348/162 |
| 7,333,270 B1* | 2/2008 | Pochapsky ................ F41G 1/32 250/330 |
| 2004/0196566 A1 | 10/2004 | Beystrum et al. |
| 2007/0222854 A1* | 9/2007 | Pochapsky ............. G03B 33/12 348/33 |
| 2008/0025640 A1* | 1/2008 | Trudeau ............. H04N 5/23248 382/294 |
| 2012/0030985 A1 | 2/2012 | Mauricio et al. |
| 2012/0050538 A1 | 3/2012 | Lynam et al. |

(Continued)

OTHER PUBLICATIONS

European Search Report and Written Opinion received for EP Patent Application No. 21151718.0, dated May 21, 2021, 8 pages (6 pages of English Translation and 6 pages of Original Document.

*Primary Examiner* — Muhammad N Edun
(74) *Attorney, Agent, or Firm* — Workman Nydegger

(57) ABSTRACT

A modified nightvision system. The nightvision system includes an intensifier module configured to intensify received light input into the intensifier module. The intensifier module has an input side configured to receive photons of the received light and an output side configured to output intensified light resulting from the received light. The night vision system includes an added display unit proximate the output side of the intensifier module, the display unit configured to output graphical content. The night vision system includes an added beam combiner optically coupled to the display unit and the output side of the intensifier module. The beam combiner is configured to combine the intensified light and graphical content. The night vision system includes an eyepiece optically coupled to the beam combiner. The eyepiece is configured to receive the combined intensified light and graphical content and to provide the combined intensified light and graphical content to a user.

22 Claims, 17 Drawing Sheets

(56) References Cited

U.S. PATENT DOCUMENTS

2012/0097741 A1* 4/2012 Karcher ................. F41G 3/142
235/404
2016/0061567 A1 3/2016 Regan et al.
2020/0049455 A1* 2/2020 Hamilton ................. F41G 3/06

* cited by examiner

NIGHTVISION WITH INTEGRATED MICRO-DISPLAY MODULE

BACKGROUND

Background and Relevant Art

Nightvision typically refers to electronic systems that are able to assist a user to see in darkened environments. Generally, nightvision devices function in a fashion such that individuals other than the user are not readily made aware of the use of the nightvision devices.

Thus, for example, rather than using a flashlight which emits light in the visible spectrum, such that the light is quickly detectable by other individuals, some nightvision devices use naturally occurring illumination outside of the visible spectrum and convert emissions, reflections, and combinations thereof to visible spectrum emissions. For example, some nightvision systems measure infrared thermal energy and convert that infrared thermal energy into a visual image viewable by a user. This thermal energy may be emitted by objects being viewed by the user. Thus, no additional illumination is needed as energy perceptible by the nightvision device is received from objects being viewed themselves.

Alternatively, or additionally, some nightvision devices emit infrared light that is reflected off of objects, and the reflections are detected by the nightvision devices. While additional illumination is introduced by these nightvision devices, the additional illumination is typically in the non-visible infrared spectrum such that external observers cannot readily detect the additional illumination.

In yet another example, faint existing illumination can be intensified and used to view objects using nightvision systems. For example, light emitted from stars, faint building lights, or other faint lights is reflected off of objects and into a nightvision system. The nightvision system may have amplification of light photons reflected into the nightvision system, by use of an intensifier module, such that the nightvision system can display a more visible representation of objects in an environment without introducing additional illumination beyond the ambient lighting in the environment.

While nightvision technology previously experienced periods of rapid growth and advancement, nightvision technology has been somewhat mature for a significant period of time. Indeed, users of nightvision goggles and other nightvision devices have demanded significant changes in decades. This means that there are numerous nightvision devices in existence and use that have been used for a significant period of time, but are advanced enough with respect to the nightvision capabilities that replacement of such devices with state-of-the-art devices has been slow. One such device is the AN/PVS-14 (Army-Navy/Portable Vision Search-14) nightvision device. This device has been widely adapted for military and civilian use. Indeed, it is estimated that there are over 1 million such devices in circulation and use. The nightvision portion of these devices is generally suitable for the perceived needs of most users and may remain so for the foreseeable future, due to the cost of replacement.

However, ancillary functions associated with nightvision devices do continue to advance at a rapid pace such that while existing nightvision devices are acceptable with respect to their nightvision functionality, other ancillary functionality is either nonexistent, obsolete, or otherwise less than state-of-the-art. Such ancillary functions may include the ability to overlay additional images on a nightvision display output to a user. For example, such additional images may implement a heads up display (HUD) to provide the nightvision device user with additional information.

The PVS-14 unit is fully water tight, and gas-purged with dry nitrogen to ensure no fogging of the optics. Replacing any of the housing, optics, or battery assembly, would be a several hundred dollar expense which would make a retrofit less desirable, but still possible. However, the additional expense may be acceptable for the increase in capability if other more expensive portions of the unit can be salvaged and used in the upgrade.

With respect to cost, nightvision devices often incorporate components that are relatively expensive. In particular, optics, photo cathodes, detectors, and the like are relatively expensive when compared with components for implementing certain ancillary functions. Thus, it would be useful if modern ancillary functionality could be added to existing nightvision devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an upgraded nightvision system. The nightvision system includes an intensifier module configured to intensify received light input into the intensifier module. The intensifier module has an input side configured to receive photons of the received light and an output side configured to output intensified light resulting from the received light. The night vision system includes an added display unit proximate the output side of the intensifier module, the display unit configured to output graphical content. The display unit is configured in size and shape to be subsequently added to existing night vision systems. The night vision system includes an added beam combiner optically coupled to the display unit and the output side of the intensifier module. The beam combiner is configured to combine the intensified light and graphical content. The beam combiner is configured in size and shape to be subsequently added to existing night vision systems. The night vision system includes an eyepiece optically coupled to the beam combiner. The eyepiece is configured to receive the combined intensified light and graphical content and to provide the combined intensified light and graphical content to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
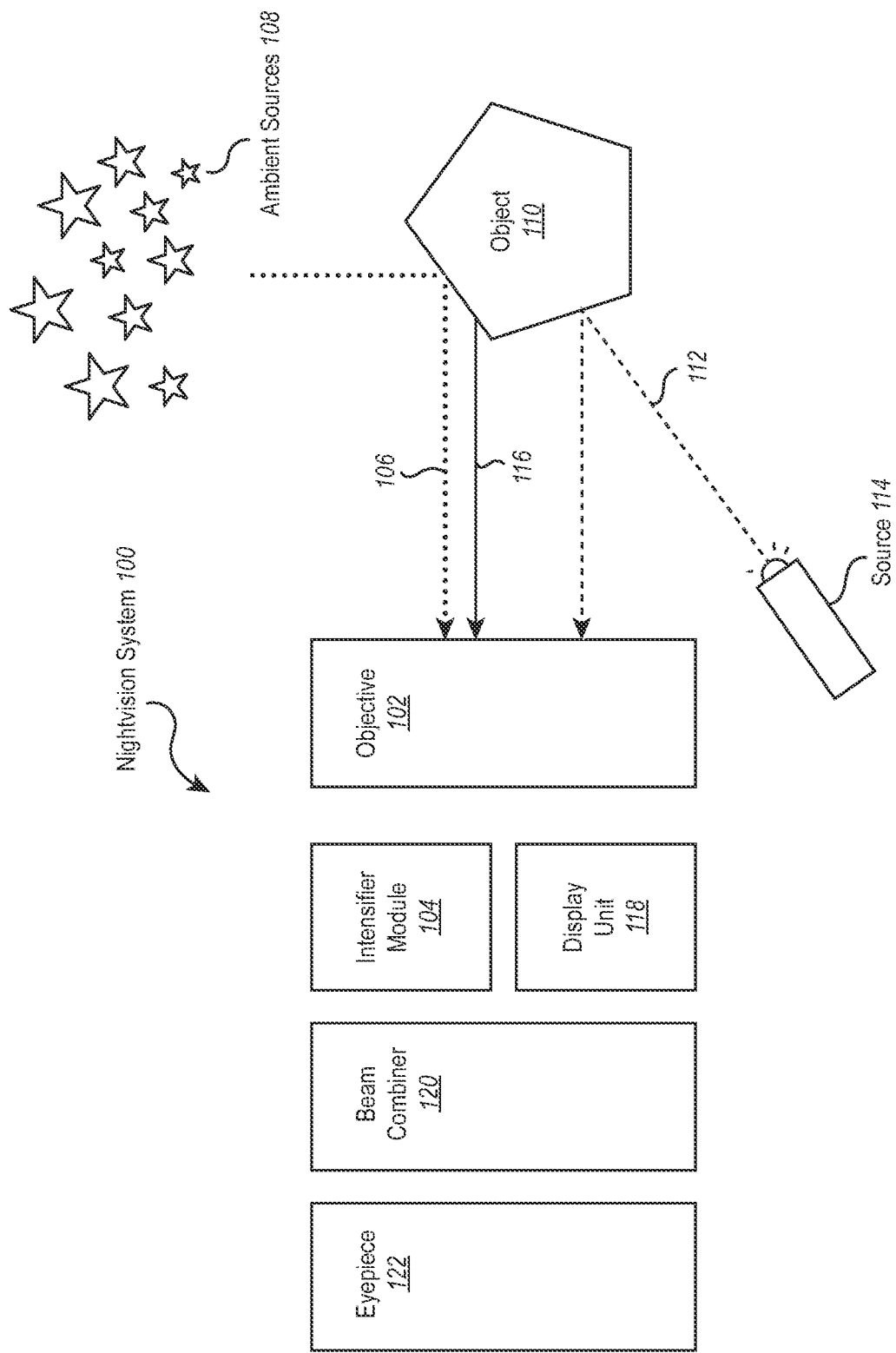
FIG. 1 illustrates a block diagram of a nightvision system.

As discussed above, it would be useful if modern ancillary functionality could be added to existing nightvision systems. For example, it may be useful to add an additional display to an existing nightvision system. In particular, some embodiments described herein are directed to implementing a heads up display adding image overlay capabilities with a nightvision system.

The heads up display may display to the user, in the field-of-view of an environment, various pieces of information. Such information may include, for example, a navigational heading, the speed at which the user is moving, coordinates, communication messages (such as email, SMS, etc.), time of day or other timing information, vital signs for the user such as heart rate or respiration rate, indicators indicating whether an object being viewed by the nightvision system is friendly or adversarial, battery charge level for the nightvision system or other devices, weather conditions, contact information, audio information (such as volume, playlist information, artist, etc.), etc.

However, as will be illustrated in more detail below, adding such functionality to existing nightvision systems has some challenges. In particular, it is often important that the form factor of the existing nightvision system not be changed (although some embodiments illustrated below do allow for form factor changes). This can be due to the fact that changing the form factor represents a significant expense as there would need to be changes to enclosures and other configurations. Further, there is very limited space in the existing devices to implement the additional functionality.

To address these issues and/or other issues, various embodiments herein can substitute certain existing parts in the nightvision systems with new parts in a way that allows to maintain existing form factors and externally accessible buttons and other interfaces of the systems. Additional details are now illustrated.

Adding a display to existing nightvision systems has various challenges. For example, one challenge relates to space issues. In particular, there is only a limited amount of space available in existing nightvision systems to add the additional display.

Note that some have attempted to circumvent the space issue by using a clip-on device on the light side of the nightvision system. However, this has a number of different drawbacks. For example, if the display is too bright, the amplification of the image intensifier module will result in the amplification of the display image to a degree that will wash out the desired nightvision images. This requires additional tuning of the display for different environments in which the nightvision system is being used to prevent the washout. In highly active environments, any distraction requiring manual tuning of the nightvision system due to changing lighting, could be dangerous. Another drawback relates to burn-in. In particular, having light from the light side amplified by the imager module could cause burn-in on the phosphor portions of the intensifier module causing permanent damage to the intensifier module as light from the display is amplified by the intensifier module. Another disadvantage to this solution is that it adds additional size and weight to the nightvision module as it is placed distal to the user's eye. This results in a larger lever arm amplifying the additional weight with respect to the user's face. Thus, as will be illustrated in more detail below, some embodiments herein are able to add the additional display without changes to the form factor of the nightvision system, and without needing to amplify the display output in the image intensifier module.

Another challenge that exists relates to maintaining existing functionality in the nightvision system. For example, as will be illustrated in more detail below, one solution to dealing with the space constraints is to remove an existing light pipe that is used to convey light from a low battery LED and/or an IR illuminator LED (indicating that an IR illuminator flashlight is on to alert the user that they are broadcasting large amounts of light visible by various cameras and other nightvision users) on a system board in the nightvision system. However, it is important that these LEDs be visible to a user (or that the user otherwise be made aware of a low battery situation or IR illuminator flashlight state) so that the user knows when the nightvision system is running low on battery power or when IR light is being broadcast from the IR illuminator flashlight. Thus, some embodiments illustrated herein include functionality for ensuring that any modifications to the nightvision system to add to the display include further modifications to ensure that existing functionality is not lost.

Another challenge that exists with adding a display to a nightvision system relates to how power will be supplied to the added display. That is, embodiments illustrated herein include modifications for providing power to the newly added display.

Another challenge that exists when adding a display to a nightvision system relates to ensuring that the display has focal compatibility with the existing system. In particular, the display should display information at the same focal distance as the intensified images output from the nightvision system, in some embodiments. In particular, in many applications, it is important that the user not need to focus at a different focal distance when switching between viewing the output of the display and the ordinary intensified output of the nightvision system. That is, the user should be able to view objects in the environment using the nightvision system as well as the output from the display with both in-focus at the same time.

Another challenge that exists when adding a display to a nightvision system relates to ensuring that the system is adaptable to potential uses. For example, existing nightvision systems are used in a number of different configurations. For example, nightvision systems may be used in a binocular fashion with one nightvision system used for each eye. Typically, the nightvision systems are attached to a helmet using a helmet mount which pivots to provide several different positions. Thus, the pivoting may be different depending on whether the nightvision system is being used for a left eye, a right eye, a weapon system, etc. Indeed, the nightvision PVS-14 mounts to a unique helmet mount which pivots to provide several positions (2 left eye, 1 right eye). If a display is installed inside the system, it would tilt at discrete angles based on which eye position was being used. This is unwanted as reading text at odd angles, or upside down, is not desirable. Indeed, the human eye is very sensitive to angular rotation. While small amounts are tolerable, large displacements are not welcome for instantaneous readability. This tilting may affect how the output of the newly added display is displayed to a user in the nightvision system incorporating the new display. Thus, embodiments illustrated herein may include functionality for allowing for different angles of use, while still maintaining a comfortably readable display.

When adding a display to a nightvision system, it may also be useful to add other functionality desirable for use with the newly added display. For example, as discussed previously, it may be useful to display certain information to a user. This information may come from any one of a number of different sources, and may even be conveyed to the user from a remote location such as from another user, from a command station, or other source of information. Thus, there may be a need to add additional functionality to allow this information to be received, such as wireless communication hardware that is able to receive over the air communications. In some embodiments, there are strict requirements for such hardware. For example, many military applications require that any communications be transmitted using encrypted Wi-Fi technologies or other secure transmission means.

The discussion below illustrates how various issues can be addressed and how functionality can be added to existing nightvision systems.

As a general overview attention is now directed to FIG. 1. FIG. 1 illustrates a nightvision system 100. While FIG. 1 illustrates a block diagram version of a nightvision system 100, more realistic and accurate illustrations will be provided herein in other figures. However, the basic example shown in FIG. 1 can be used to understand general concepts of various embodiments illustrated herein. FIG. 1 illustrates that the nightvision system 100 includes an objective 102. The objective 102 includes various optics such as lenses, waveguides, and/or other optical components for receiving and transmitting light to an intensifier module 104. FIG. 1 illustrates three different sources of light.

For example, the light path 106 illustrates light received at the objective 102 from ambient sources 108. Such ambient sources may be light from heavenly bodies such as stars, the moon, or even faint light from the setting sun. Additionally or alternatively, ambient sources could include light from buildings, automobiles, or other faint sources of light that cause reflection of light from an object 110 being viewed in a nightvision environment into the objective 102.

A second source of light is illustrated by the path 112 which shows light being emitted from an external source 114 towards the object 110, reflected off of the object 110, and into the objective 102. For example, the source 114 may be an infrared source that is not viewable in the viewable spectrum for human observers. For example, the source 114 may be an IR illuminator flashlight included in the nightvision system 100. Nonetheless, the nightvision system 100 is able to convert the light emitted from the source 114 into a viewable image for the user.

A third source of light illustrated in FIG. 1 is light emitted by the object 110 itself. For example, this may be related to infrared heat energy emitted by the object 110 and directed into the objective 102 as illustrated by the path 116. This may be, for example, in applications such as short-wave infrared (SWIR), medium-wave infrared (MWIR), and/or long-wave infrared (LWIR) enabled devices, such as systems having thermal cameras or other devices to create a simplified fusion capability on the nightvision system 100.

The objective 102 directs any received light into the intensifier module 104. Note that the intensifier module 104 may include functionality for amplifying light received from the objective 102 to create a sufficiently strong image that can be viewed by the user. This may be accomplished using various technologies such as a photo cathode, a microchannel plate, and a phosphorous screen. The photo cathode may be configured to generate photo electrons in response to incoming photons in light.

FIG. 1 further illustrates the display unit 118. The display unit 118 is added to the existing nightvision system 100 in a fashion that will be illustrated in more detail below. However, as discussed above, the display unit 118 may include functionality for displaying information to a user. Such information may include graphical content, including text, images, and the like. In some embodiments, the display unit 118 is a micro display capable of displaying one or more lines of text graphics, and/or other information. In some embodiments, the micro display may display in multiple grayscale shades. Alternatively, or additionally, the micro display may display in multiple colors.

Returning once again to FIG. 1, a beam combiner 120 is illustrated. The beam combiner 120 is able to combine the images from the intensifier module 104 and the display unit 118. In some embodiments, the beam combiner 120 comprises optics that are able to cause the image from the intensifier module 104 and the display unit 118 to be displayed at the same focal distance. That is, both the image from the intensifier module 104 and the display unit 118 can be in focus for the user at the same time.

FIG. 1 further illustrates an eyepiece 122. The eyepiece 122 includes various optics for receiving light from the beam combiner 120 received from the intensifier module 104 and display unit 118. The eyepiece 122 further includes various optics for transmitting light from the beam combiner 120 to an eye of the user. In some embodiments, the eyepiece 122 may include various hoods and eyepiece fittings to allow for comfortable interface with a user's face and eye. In some embodiments, the eyepiece 122 includes a diopter. The diopter is adjustable to allow users to adjust focus of the nightvision system 100. Embodiments may be implemented where the diopter adjustment is configured to not interfere with the beam combiner 120 and potentially the display unit 118 depending on the particular configuration implemented for adding the display unit 118 and the beam combiner 122 the nightvision system 100.

Figure 2:
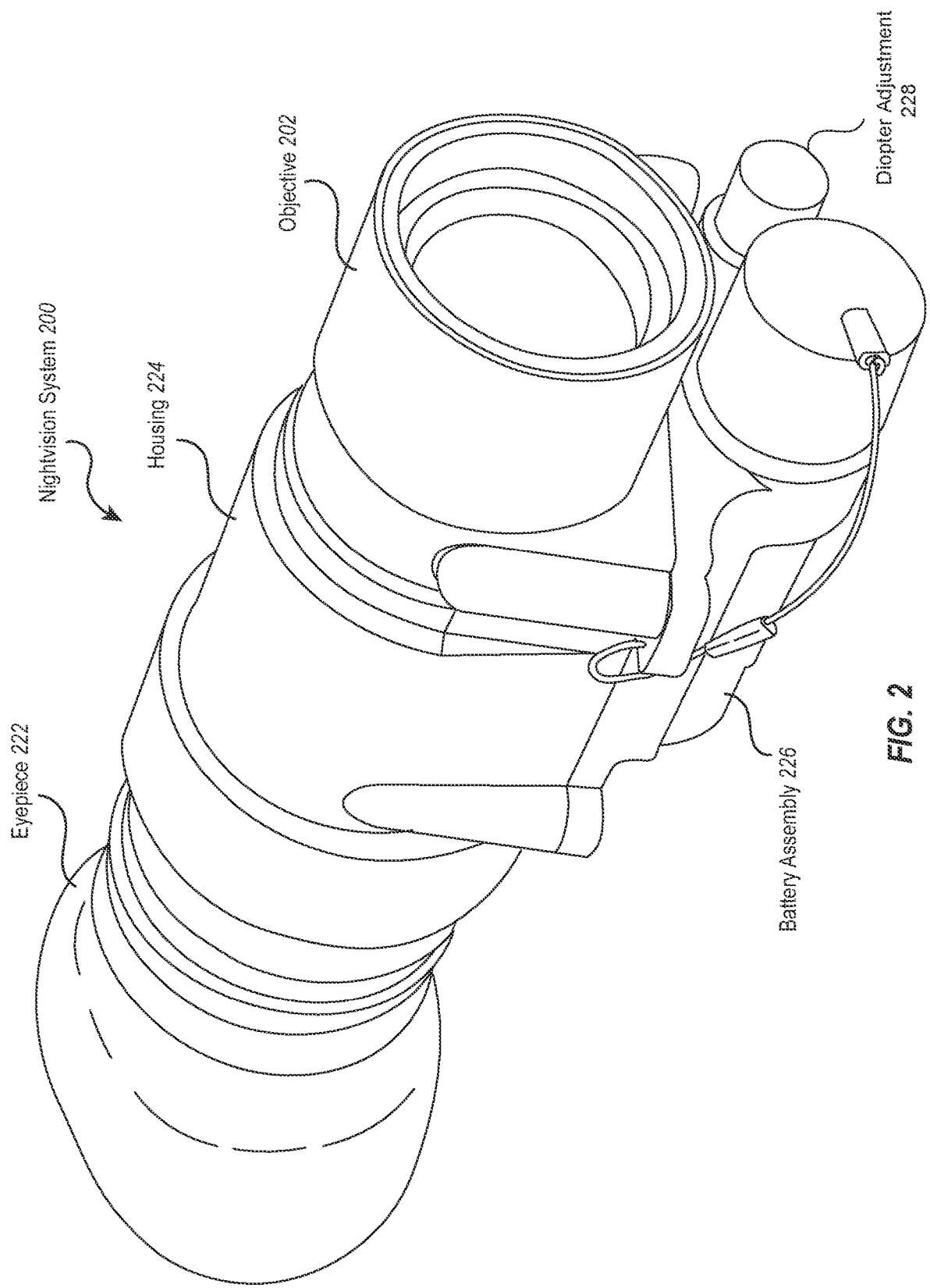
FIG. 2 illustrates a graphical representation of a nightvision system.

Referring now to FIG. 2, a specific example of a nightvision system is illustrated. In particular, FIG. 2 illustrates the PVS-14 nightvision system 200. In the example illustrated, the nightvision system 200 includes a housing 224. As will be illustrated in more detail below in other figures, the housing 224 houses an intensifier module, a display unit, and various other components. The nightvision system 200 further includes an objective 202 similar to the objective 102 illustrated in FIG. 1. The nightvision system 200 further includes an eyepiece 222 similar to the eyepiece 122 illustrated in FIG. 1. The example illustrated in FIG. 2 further illustrates a battery assembly 226. As will be shown in various examples below, modifications can be made to the battery assembly 226 to allow for inclusion of a new display unit and/or other circuitry in the nightvision system 200. FIG. 2 further illustrates that the nightvision system 200 includes a diopter adjustment 228. As will be discussed in more detail below, the diopter adjustment 228 can be modified in a fashion that allows for improved focusing giving the use of the display unit and/or the ability to create additional space within the nightvision system 200 for adding a display unit.

Figure 3:
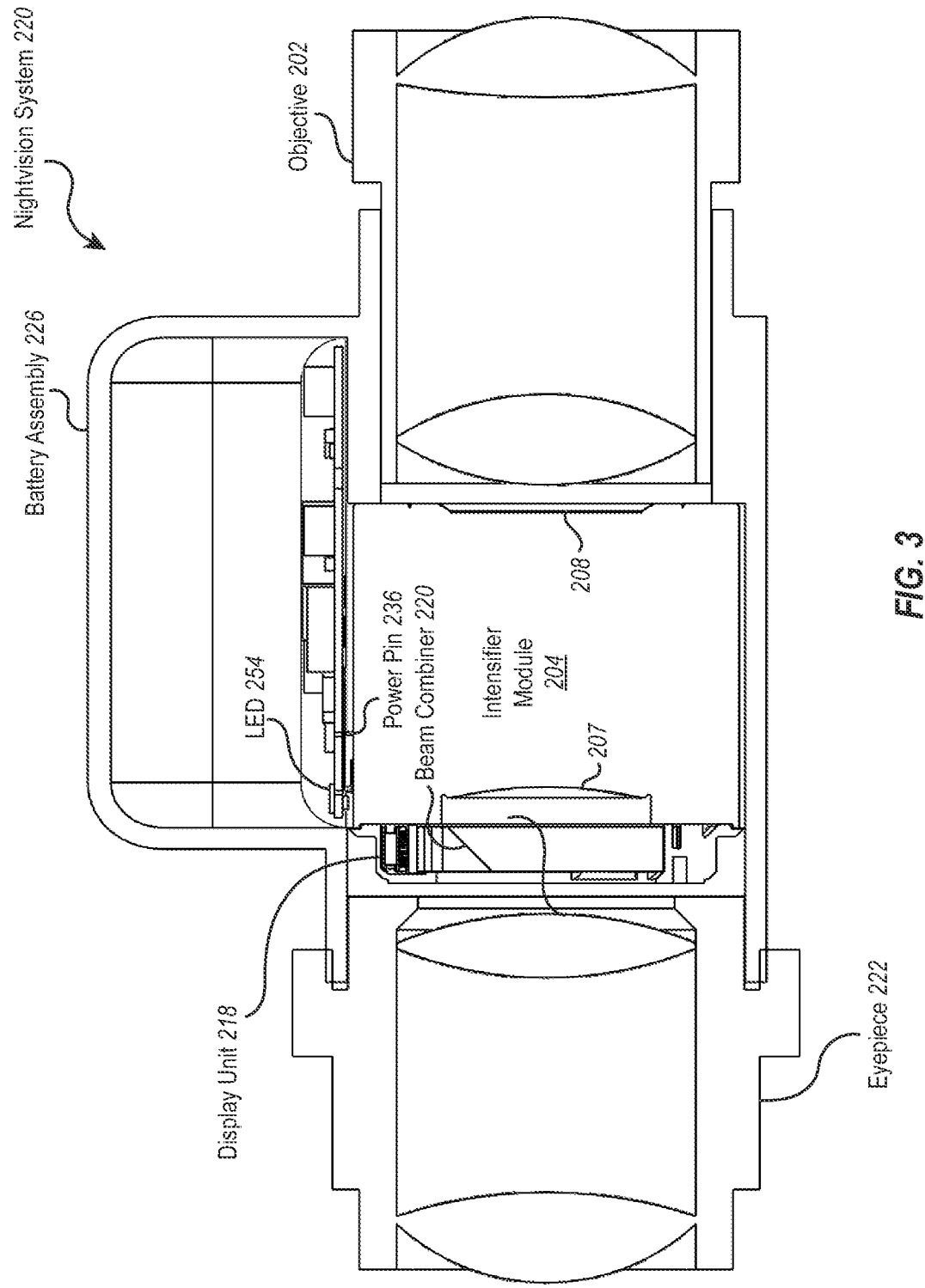
FIG. 3 illustrates a side cutaway view of a nightvision system.

Referring now to FIG. 3 a cutaway drawing is illustrated showing the nightvision system 200. In the example illustrated in FIG. 3, the various components shown in FIG. 2 are also illustrated along with components that can only be seen by observing an internal view of the nightvision system 200. In particular, FIG. 3 illustrates the intensifier module 204 similar to the intensifier module 104 shown in FIG. 1. Note that the intensifier module 204 has an input side 208 where light is received from the environment and an output side 207 where images are displayed to a user after intensification. FIG. 3 further illustrates a display unit 218 similar to the display unit 118 illustrated in FIG. 1. FIG. 3 further illustrates the beam combiner 220 similar to the beam combiner 120 illustrated in FIG. 1.

Illustrating now the functionality of the modified nightvision system 200, light, which may be infrared light, visible, or other types of light is received at the objective 202. The light received at the objective 202 is focused into the intensifier module 204. The intensifier module 204 amplifies the light and outputs the light to the eyepiece 222 as discussed previously in conjunction with the description of FIG. 1.

The display unit 218 projects various images such as those described previously. These images are projected towards the beam combiner 220. The beam combiner 220 combines the image produced by the intensifier module 204 and the display unit 218, and provides this combined image to the user through the eyepiece 222. Note that typically the display unit 218, beam combiner 220, intensifier module 204, and eyepiece 222 are configured such that a user will see the image from the intensifier module 204 and the image from the display unit 218 at the same focal distance.

Returning once again to the general example illustrated in FIG. 1, there are several methods and devices for transmitting the image from the display unit 118 into the field of view of the eyepiece 122. The following illustrates a number of examples of methods and devices that may be used alone or in combination.

Figure 4:
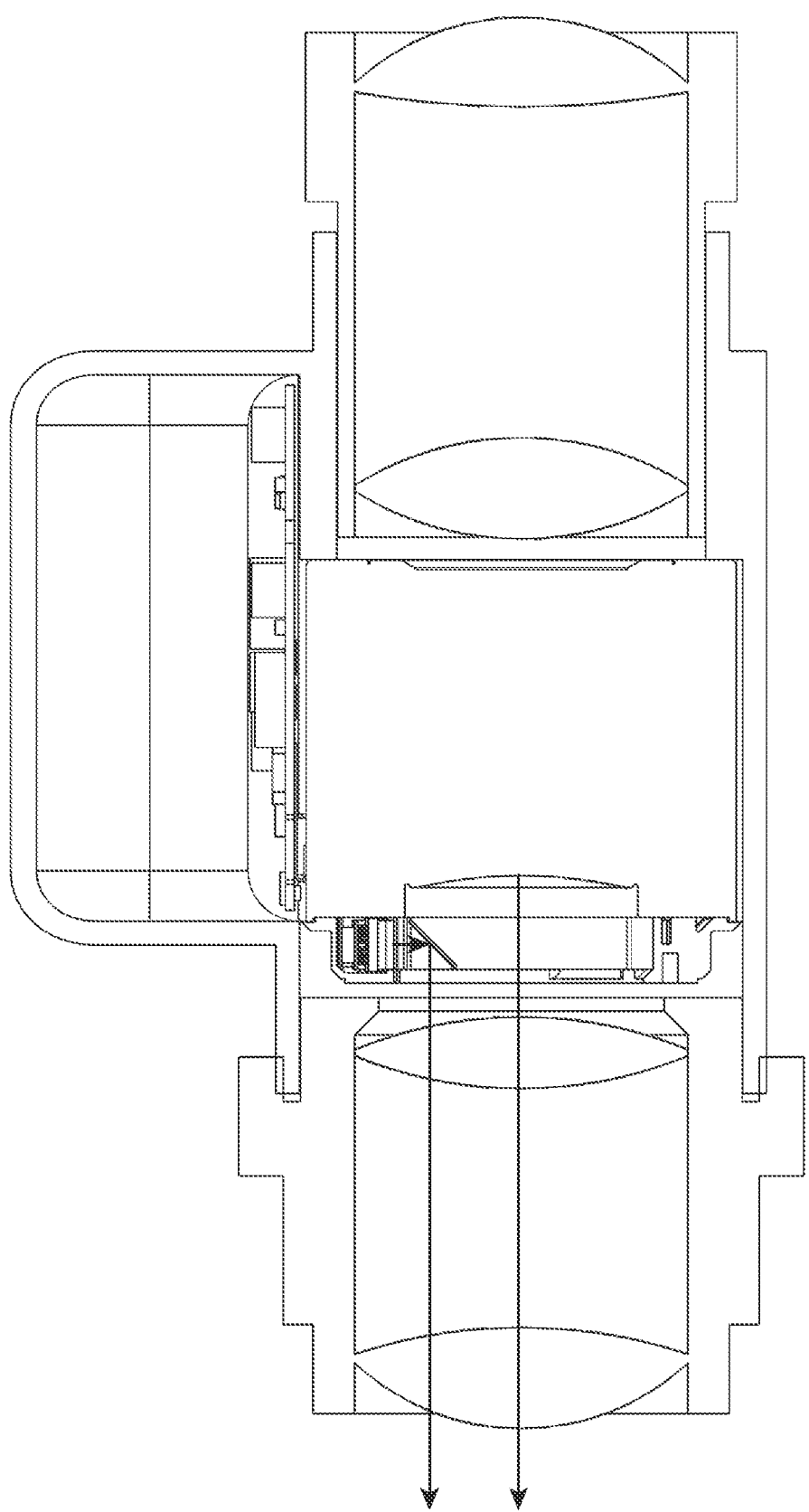
FIG. 4 illustrates a night vision system using pellicles.

In one example, illustrated in FIG. 4, pellicles may be used to transmit the image from the display unit 118 into the field of view of the eyepiece 122. These are thin pieces of glass or clear plastic used to bounce the reflection. The drawbacks are second surface reflections which "double" the image, as well as fragility (especially on a weapon mounted system). The secondary reflections can be greatly reduced by using crossed polarizing film on two interposing pieces. However, the polarizers cut light transmission. Alternatively or additionally, other antireflective coatings may be used.

In another example, waveguides may be used to transmit the image from the display unit 118 into the field of view of the eyepiece 122. The reflecting part of the waveguide is very thin, so little space is required between the eyepiece and the nightvision intensifier module 104.

Figure 5:
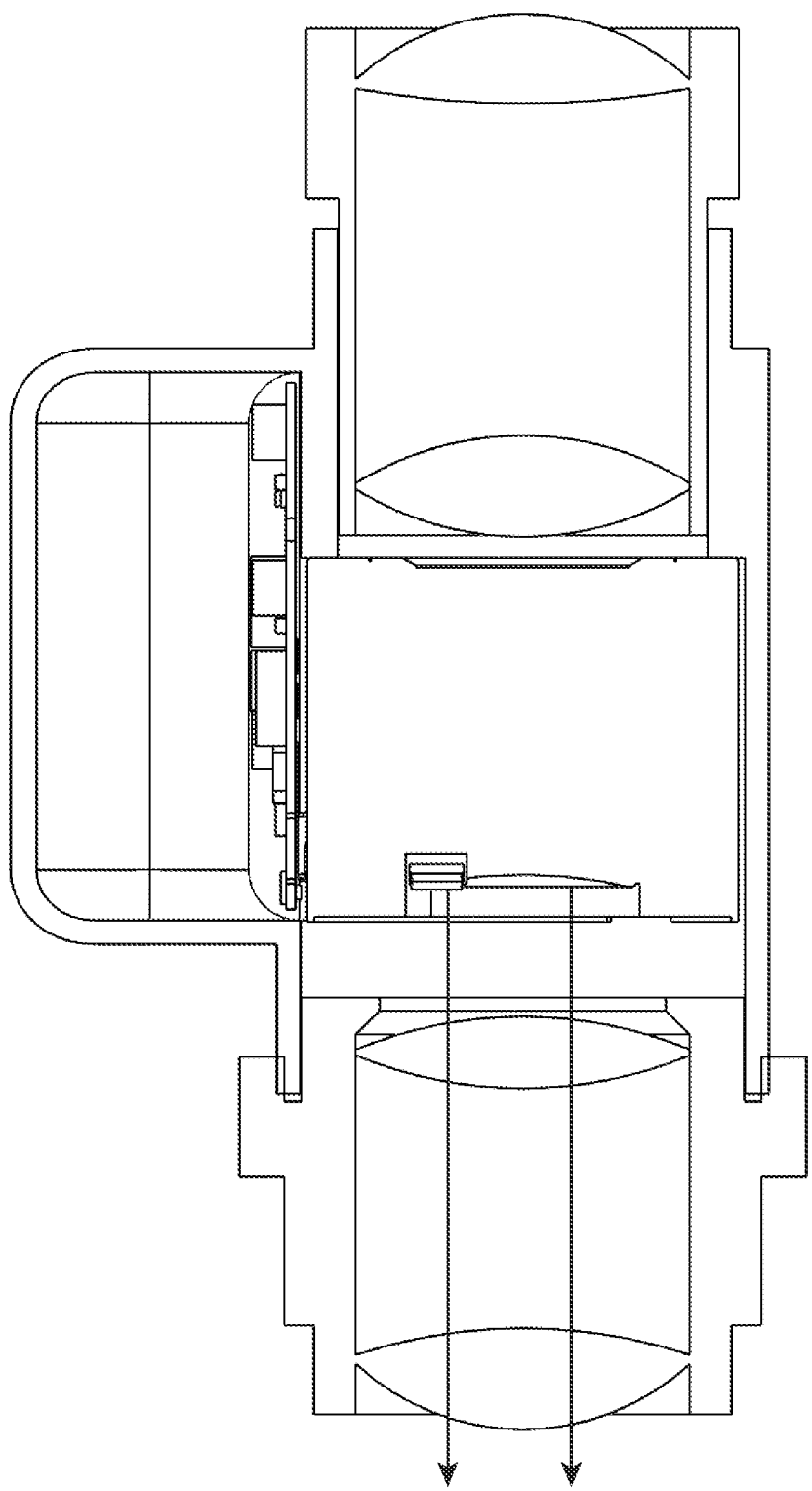
FIG. 5 illustrates a nightvision system using a direct view display unit.

In another example, illustrated in FIG. 5, off-center direct view may be used to transmit the image from the display unit into the field of view of the eyepiece 122. Thus, embodiments may be implemented where the display image will be displaced towards the edge of the field of view. This minimizes the optical path length which helps to fit the display into the restrictions of nightvision systems. Note that in these embodiments, the display is typically not right up against the edge of the display unit 118. As this is a direct view solution (i.e., the image from the display unit 118 is not redirected by reflection to the eyepiece), the display assembly board and any other components will block a portion of the output of the nightvision intensifier module 104, thus cutting off a portion of the available viewing area of the intensified nightvision image. Further, the intensifier module will have to be cut to allow for the display unit 118 to butt up against the intensifier module 104 while being in the field of view.

Note that even using other image transmission techniques, it is useful to display the graphical image of the display unit 218 in an off-centered position with respect to the graphical content image output by the intensifier module 104. That is, the image output by the intensifier module 104 has a center. This center may be, in some embodiments, a geometric center. The graphical content output by the display unit 118 may be displayed off-center to this geometric center. This allows the user to be less distracted by the image and allows the user to focus on objects in an environment. Similarly, in some embodiments, the display unit 118 may be configured to display graphical content away from significant portions of an intensified image from the intensifier module 104.

Figure 6:
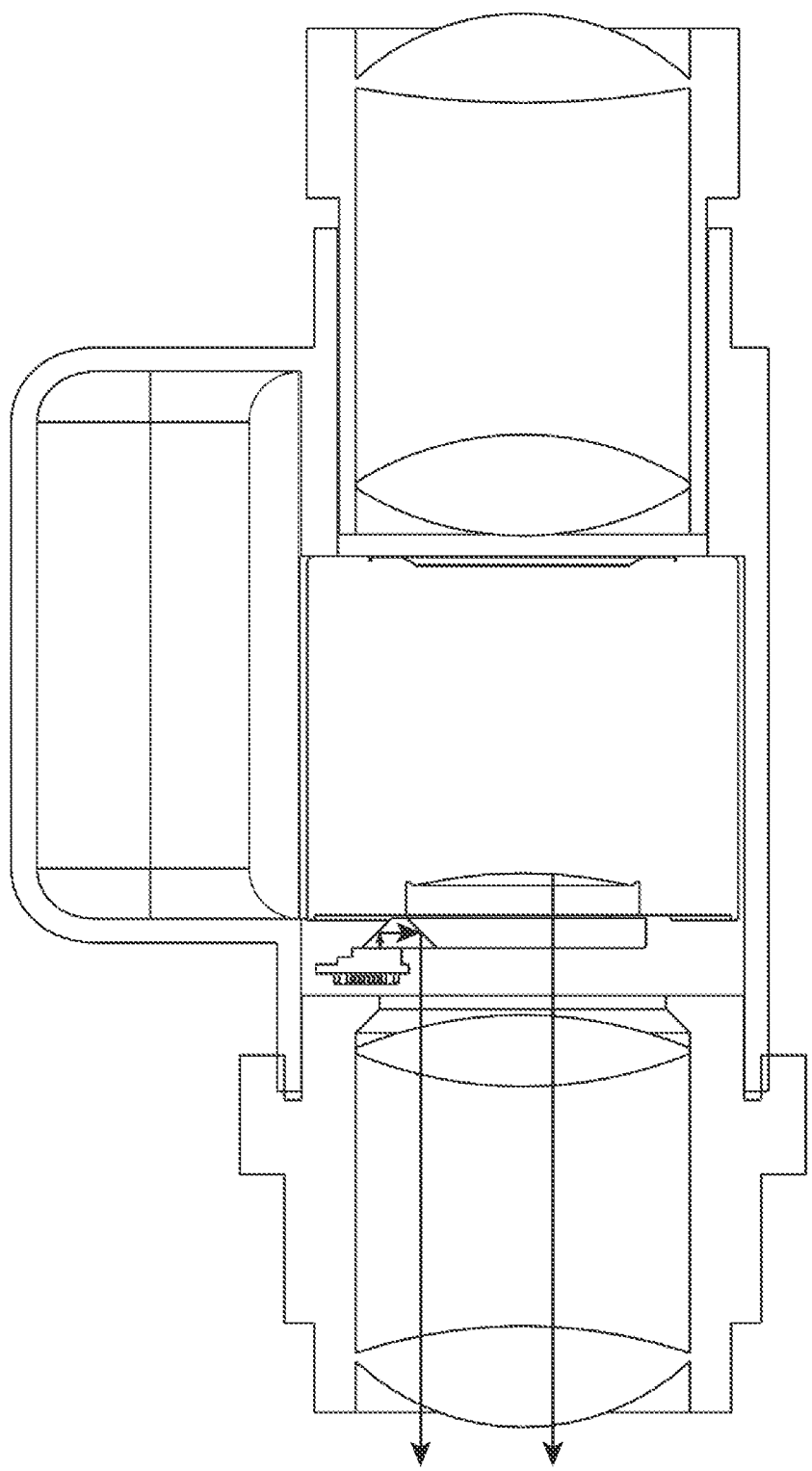
FIG. 6 illustrates a nightvision system using a dove prism.

In another example, illustrated in FIG. 6, dove prism reflection may be used to transmit the image from the display unit 118 into the field of view of the eyepiece 122. A dove prism allows for a flat mounting of the display unit 118 to the intensifier module 104, which is advantageous for saving space. Note that, in some embodiments, the rest of the field of view has glass in the path as well. This is so the total field of view does not have two different index of refraction materials which will cause the image to be out of focus in one of the two regions if glass were only provided in one region. Note that using a dove prism may not be a viable solution in some system as it puts the optical path length too long for those systems, such as in the PVS-14 application.

Figure 7:
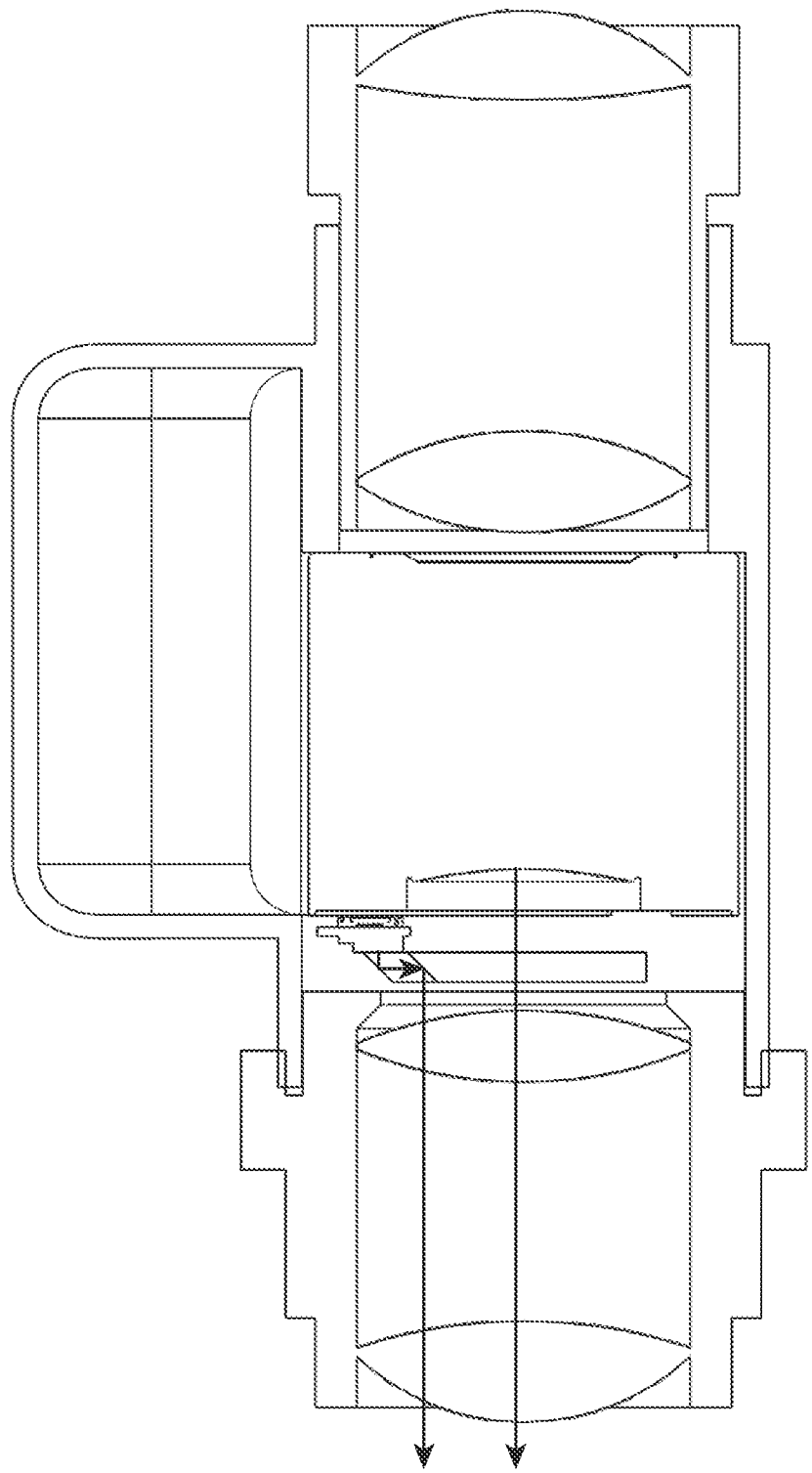
FIG. 7 illustrates a nightvision system using a rhombic prism.

In another example, illustrated in FIG. 7, rhombic prism reflection may be used to transmit the image from the display unit 118 into the field of view of the eyepiece 122. The rhombic prism allows for a flat mounting of the display to the intensifier module 104 which is advantageous for saving space. Note that, in some embodiments, the rest of the field of view has glass in the path as well. This is so the total field of view does not have two different index of refraction materials which will cause the image to be out of focus in one of the two regions if glass were only provided in one region. By moving the reflected image to the edge of the field of view, the optical path length is kept shorter than some other solutions. Note that using a rhombic prism may not be a viable solution in some systems as it puts the optical path length too long for those systems, such as in the PVS-14 application.

Figure 8:
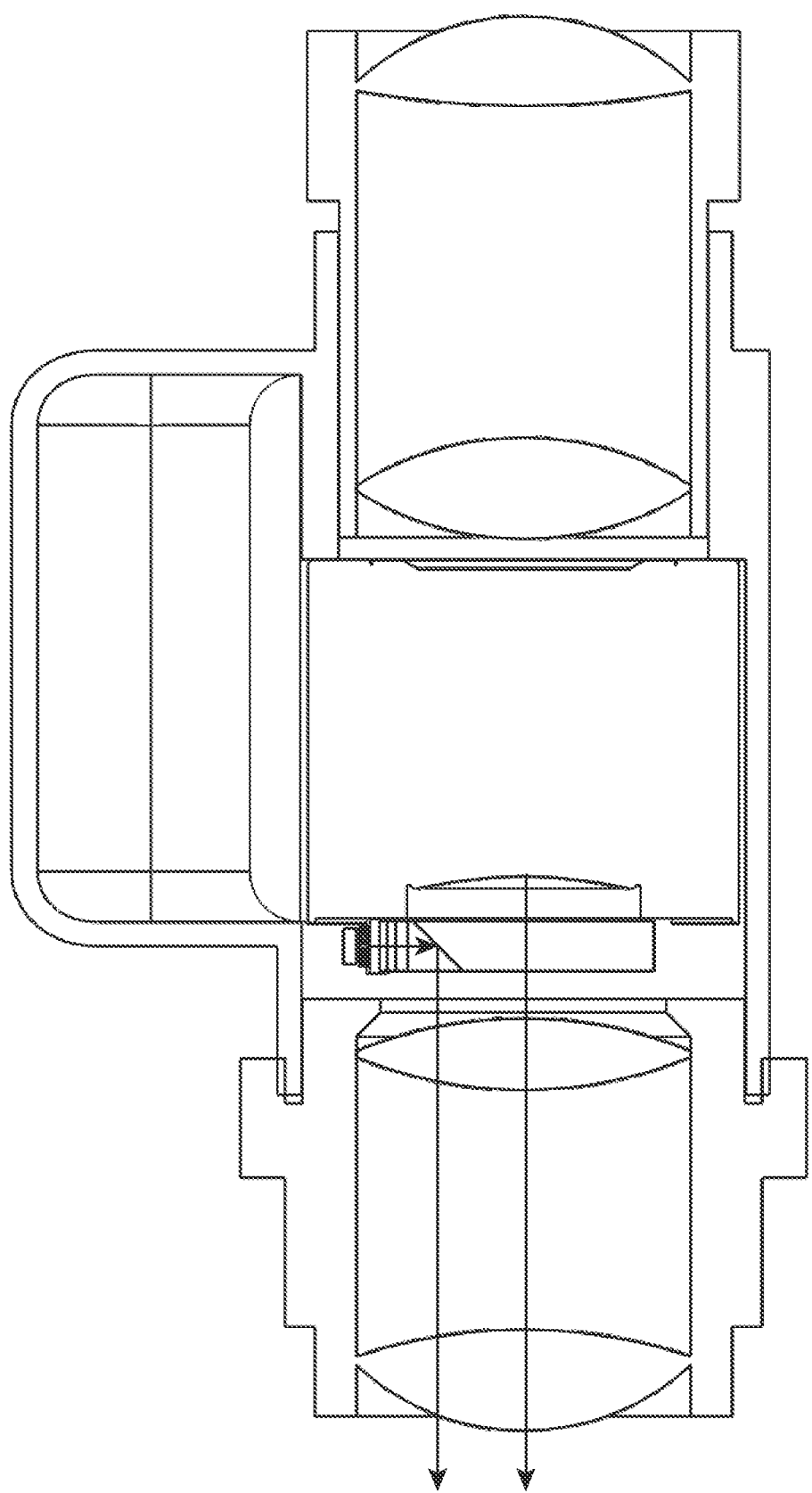
FIG. 8 illustrates a nightvision system using a 2 prism beam combiner.

In another example, right angle prisms used as a beamcombiner may be used to transmit the image from the display unit 118 into the field of view of the eyepiece 122. For example, in some embodiments, a beamcombiner comprising a semi-reflective angled surface is utilized to inject the display unit image onto the field of view. The display unit image and the output of the nightvision intensifier module 104 are output to be simultaneously in focus when viewed through the eyepiece 122. A PVS-14 nightvision system with 2 prism beamcombiner type display unit is shown in FIG. 8. In some embodiments, a right angle application is implemented. In this example, the path length is the shortest of the demonstrated solutions which allows for the most compact display unit. Again, by moving the reflected image to the edge of the field of view, the optical path length is kept short.

Figure 9:
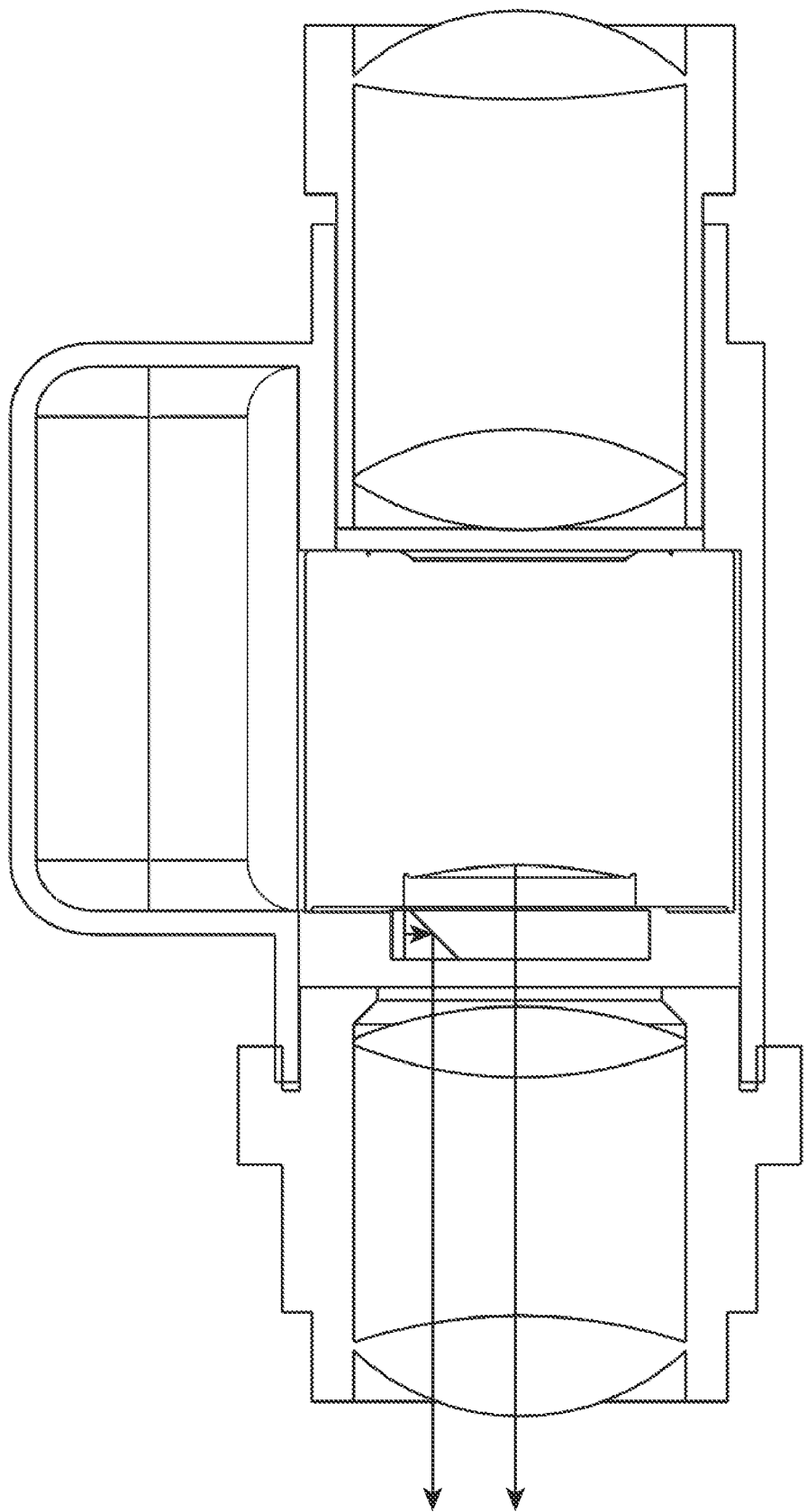
FIG. 9 illustrates a nightvision system using a full field of view interposer.

Some embodiments may implement a full field of view clear optical interposer, as illustrated in FIG. 9. This may be the beamcombiner, or any of the other optical versions already mentioned above, or a plain piece of glass/plastic. Some existing nightvision systems have a fixed focal length due to the eyepiece optics design. Further, the system 100 has limited space between the eyepiece 122 and the nightvision intensifier module 104. To gain more space inside the system, this interposer piece can be inserted. In some embodiments, it has an index of refraction in the range of 1.4 to 2, which will make the image appear closer to the eyepiece 122. To compensate for this effect, the eyepiece 122 can be unscrewed, hence making the internal spacing inside of the housing larger. On some systems, a diopter adjustment also moves the lens assembly of the eyepiece 122, so it can also allow either more diopter adjustment, or more internal space. The PVS-14 has limited thread engagement, so only a certain amount of this effect can be tolerated before the eyepiece 122 does not have enough threads to engage.

This effect can be tuned by the thickness of the optical interposer along the optical axis. In the PVS-14 application, that happens to be at about 0.17" thick.

Further, the index of refraction of the optical interposer can be appropriately engineered. Selecting glass or plastic, with an index of refraction from 1.4 to about 2, will allow for more unscrewing of the eyepiece 122 where the higher the value is, the more unscrewing of the eyepiece 122 can be performed. This will allow for more room to put the display unit 118, and allow for more diopter adjustment range.

Note that in all these applications, it is optimal if the path from the display of the display unit 118 to the eye has the same effective length as from the eye to the face of the image intensifier module output surface.

Figure 10:
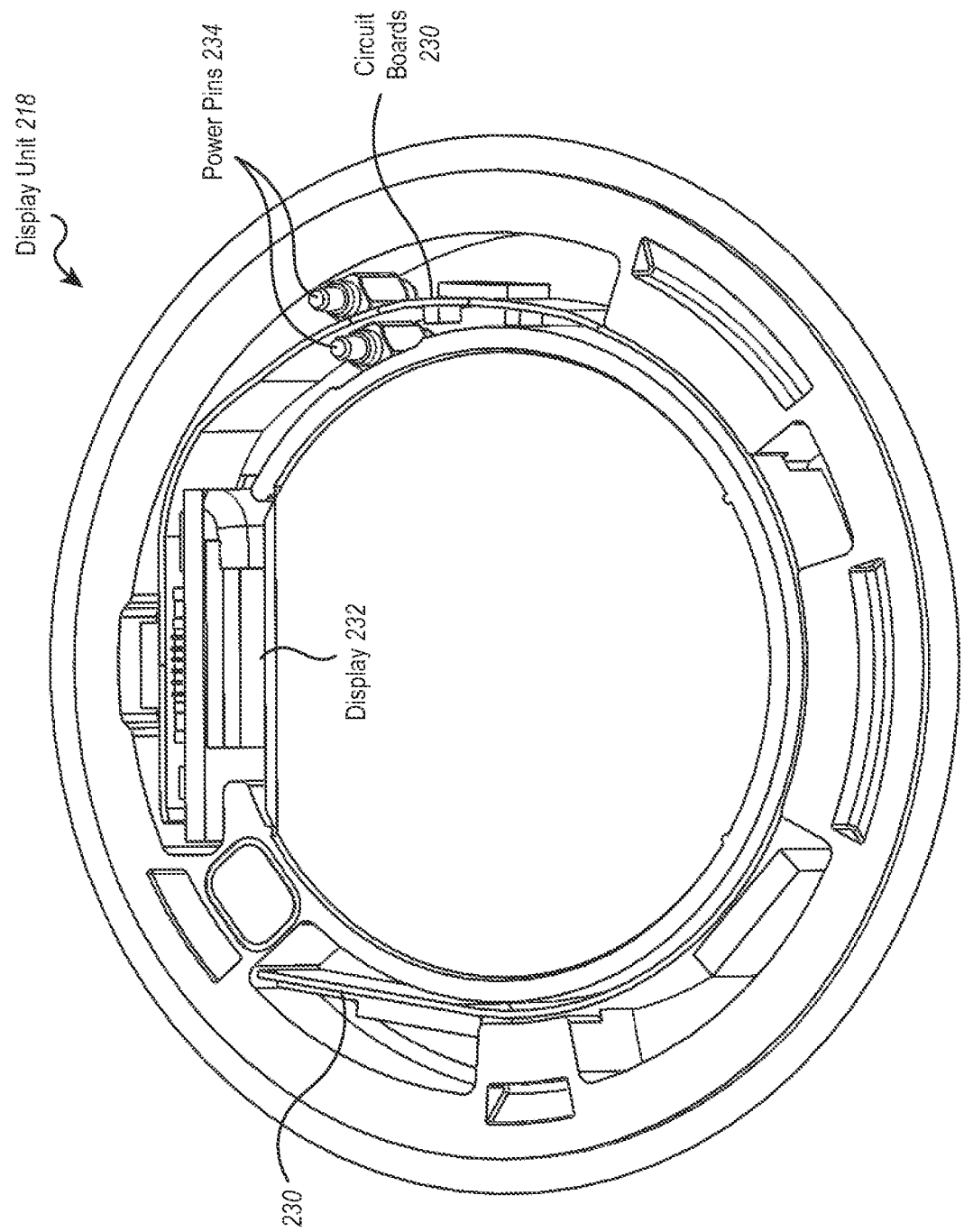
FIG. 10 illustrates a display unit for use in a nightvision system.

Referring now to FIG. 10, additional details are illustrated regarding the display unit 218. FIG. 10 illustrates that the display unit 218 includes various circuit boards 230. The circuit boards 230 include various circuitry to drive a display 232.

In general, the display unit 218 is designed to be as short as practicable to fit within the nightvision system 200 without limiting the diopter adjustment 228. However, if more height is needed, a diopter extending element can be added to the eyepiece assembly to allow more space. Alternatively, in some embodiments, the diopter adjustment 228 may be limited depending on the application.

Alternatively, embodiments may implement an extension adapter which screws on to the system housing 224 where the eyepiece 222 usually attaches. This provides for additional length along the optical axis. A new eyepiece design can be implemented, and attached to the extension adapter, which will take advantage of this extra length and compensate for the increased focal length.

By stretching the housing, an additional amount of space can be gained internal to the sealed nightvision system 200.

The display 232, in some embodiments, is capable of multiple lines of text, graphics, and at multiple grayscale shades or multi-color. More display area is always welcome, but practically must be limited based on optical geometry and physical existing space. In some embodiments, the display 232 is an organic LED micro-display, that is approximately 4.5 mm in diagonal.

In the example illustrated, the display unit 218 is self-contained, so all image generation and processing chips must be present on the circuit boards 230. Power conversion circuitry may be included on the circuit boards 230 as well.

In some embodiments, the circuit boards may include one or more of an Inertia Measurement Unit (IMU), a compass unit, and wireless communications. In some embodiments, this can be integrated within the existing image intensifier module power supply board.

Other additional components can also be implemented. For example, GPS, Wi-Fi, and encrypted WiFi chipsets can be implemented. However, due to size, these components may not be implemented at the display unit 218. In some embodiments, these components may be implemented by replacing the circuit boards in the battery assembly 226 (see FIG. 2) with appropriately sized circuit boards. Note that in some embodiments, the battery assembly 226 may be replaced with a larger battery assembly to allow for the inclusion of additional components and/or circuit boards. This could include various infrared devices, such as SWIR, MWIR, and/or LWIR devices, such as thermal cameras or other devices to create a simplified fusion capability on the system 200. Alternatively, or additionally, some or all of these components discussed above could be, at least partially, implemented on a flex tail, such as by replacing the tail 249 illustrated in FIG. 10 with a tail including various additional components.

FIG. 10 illustrates that power pins 234 are coupled to the circuit boards 230. The power pins 234 provide a conductive means for applying power to the circuit boards 230 and display 232 to display the various images displayed by the display unit 218.

In some embodiments, power transfer to the display unit 118 can be accomplished by pogo pins which press down on electrical pads, or bent metal "finger" style contacts which also would press down on the same provided electrical pads implemented as the positive supply conductor 244 and negative supply conductor 246.

Returning once again to FIG. 3, a power pin 236 is illustrated which is connected to the batteries in the battery assembly 226. The power pin 236 connects to a pad 238 (see FIG. 11) on the intensifier module 204. This interconnection provides power to the intensifier module 204 to allow the intensifier module 204 to operate.

As noted above, power is needed for the newly added display unit 218. In some embodiments this power can be provided by changing the battery assembly system board to get power and information to the display unit 218, tapping off existing items within the system, or providing an internal power source to get power and then information can be provided from self-contained electronics.

While the first option is generally easier, it is also much more expensive in terms of total system board redesign plus the logistical problem of retrofitting existing systems in the field with soldering and rewiring. Including an internal power supply is not attractive as it would require breaking the system seal to replace.

Thus, in some embodiments, the second option identified above, tapping off of existing system components to provide parasitic power to a self-contained display unit and associated electronics, is implemented. In some embodiments, this may be implemented using a standard nightvision image intensifier module, optional standard pvs-14 EGAC tail 249 (as a separate component or built into the power interposer 240), a novel self-contained display unit 218 and electronics, and a novel flex circuit-based power interposer 240.

In some embodiments where the interposer 240 module cannot rotate inside the system housing due to the fixed power contact locations, one embodiment provides a flex-style interposer to tap off power and ground and transfer them to concentric power and ground traces positioned on the output end of the interposer 240 which will provide power to a self-contained display unit 218 in virtually any orientation. Spring-loaded contacts (e.g., pins 234) are used in the display unit to make contact to the concentrically arcing traces shown as positive supply conductor 244 and negative supply conductor 246.

This solves the problem of the nightvision interposer 240 having to be in a specific orientation in the nightvision system housing, and providing power to an auxiliary display unit 118 which may be positioned in any of many multiple angular orientations.

Figure 11:
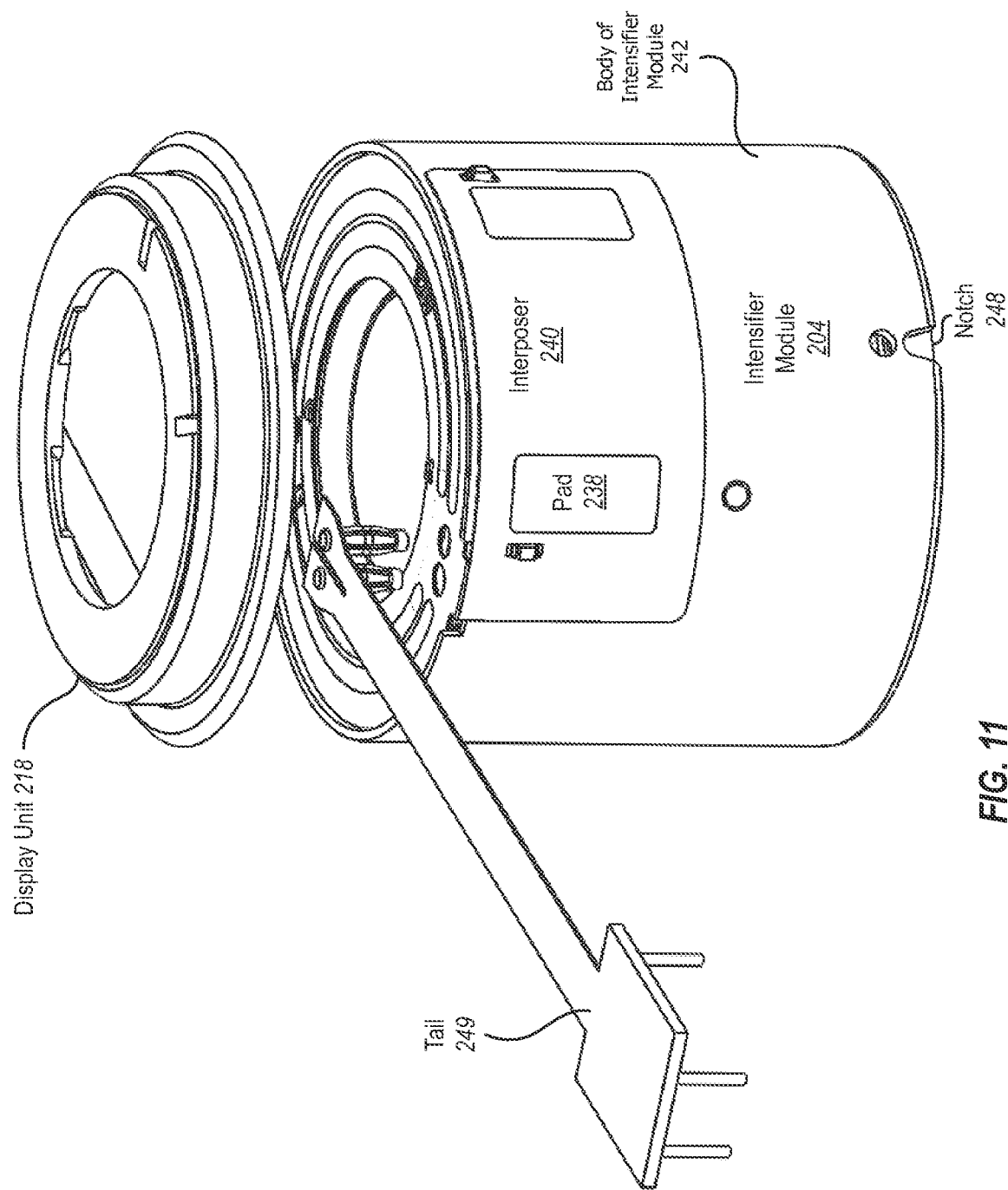
FIG. 11 illustrates a display unit and intensifier module arrangement for use in a nightvision system.
Figure 12:
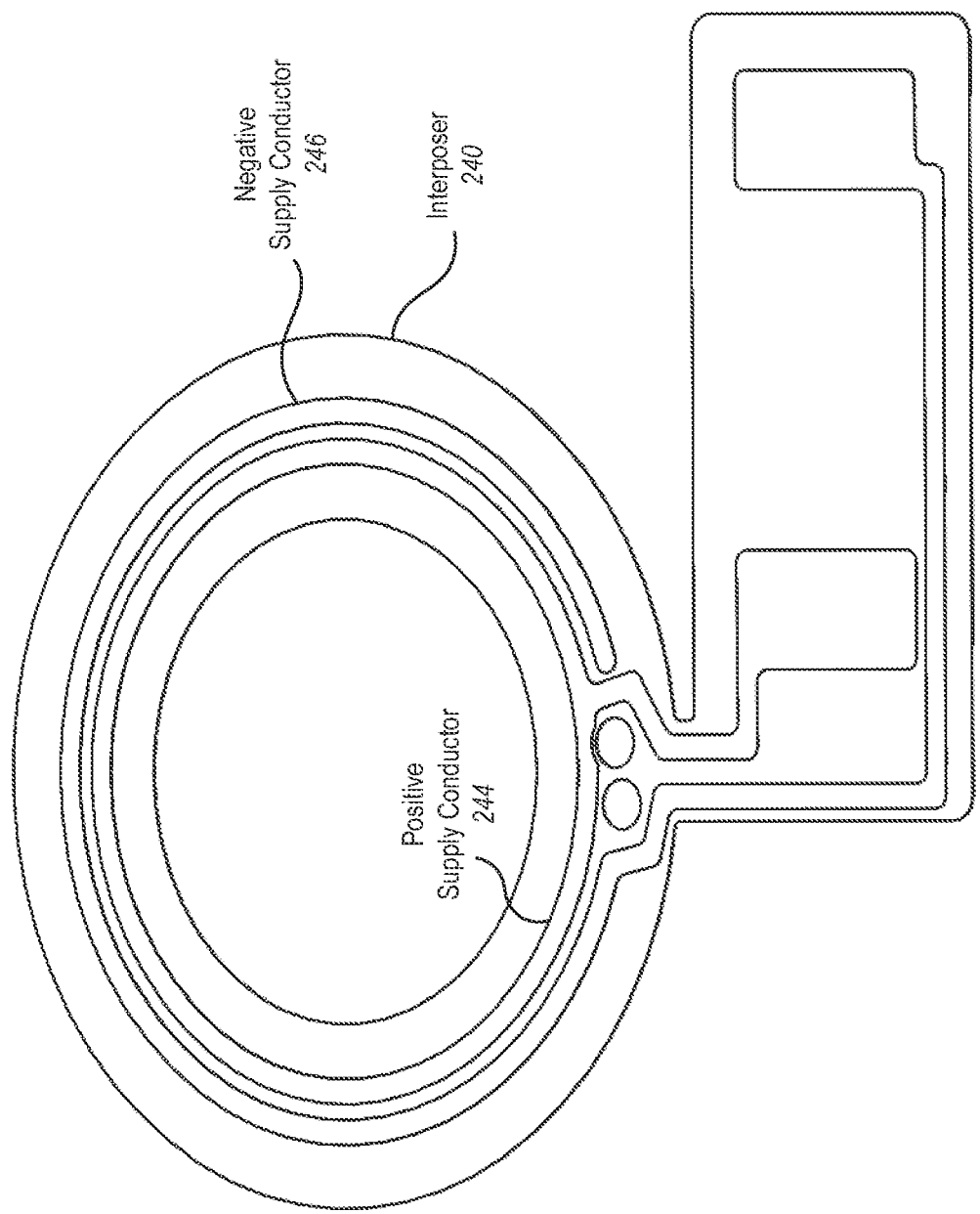
FIG. 12 illustrates additional details with respect to an interposer.

Thus, some embodiments illustrated herein, can implement a parasitic power source in the form of an interposer 240. The interposer 240 is implemented in a fashion to obtain the power from the battery assembly 226 by being electrically connected to the pad 238. Note that in typical embodiments, the pad 238 connects to a positive source of the battery in the battery assembly 226, and the body 242 of the intensifier module 204 serves as the negative contact for the battery in the battery assembly 226. Thus, in some embodiments, a positive supply side of the interposer 240 is connected to the pad 238, and a negative supply side of the interposer 240 is connected to the body 242 of the intensifier module 204. Referring now to FIG. 12 electrical traces are illustrated showing how the pad 238 connects to a positive supply conductor 244 and how the body 242 connects to a negative supply conductor 246. Note that the positive supply conductor 244 and negative supply conductor 246 are arranged in a concentrically arcing fashion. This allows these conductors to be ultimately implemented in a concentric fashion on an output side of the intensifier module 204 as illustrated in FIG. 11. This allows the display unit 218 to be arranged on the output side of the intensifier module 204 in any one of a number of different radial orientations about the output side of the intensifier module 204. In particular, by observing the pin locations for the pins 234 illustrated in FIG. 10, it can be seen that the display unit 218 can be installed in a number of different orientations that allows the pins 234 to contact the positive supply conductor 244 and negative supply conductor 246.

In some embodiments, the interposer 240 is constructed from a single layer flex circuit material. The rear facing contact pads match up with the existing pad locations on the module. In some embodiments, the interposer 240 is constructed from conductive pressure sensitive adhesive (PSA), which can be used to conduct the power and ground from the intensifier module 204 into the flex circuit material. Alternatively, solder or solder paste is applied, and then heated to make a bond between the two components.

The interposer shown has space for a tail 249 to be inserted. Some styles of modules do not need this feature, so continuous ring traces are possible on the face of the interposer 240.

Since the intensifier module 204 cannot rotate inside the system housing 224 due to the fixed power contact locations, various solutions can be implemented as described below. For example, some embodiments provide multiple contact pads on the intensifier module 204 to tap power and ground, and/or provide multiple notches on the end of the module to fit a system aligning pin at each of the matching discrete angles caused by the helmet mount J-arm assembly (discussed below).

This solves the problem of the nightvision display at specific orientations in the nightvision system housing, while still receiving power. The electronics and display are all embedded within the same module, receiving data from an external wired or wireless connection.

The reasoning for embodiments which allow for alternative orientations of the display unit 218 are now illustrated. In particular, the nightvision system 200 may be used in a number of different orientations. For example, the nightvision system 200 may be mounted to a helmet or other headwear using a J-arm assembly mount that allows the nightvision system to be in a static position with respect to a user's eye to allow the user to use the nightvision system 200 without requiring the user to hold the nightvision system 200 with their hand. Rather, the nightvision system 200 may be mounted in a fashion that allows a user to move freely within an environment while using the nightvision system 200 and while still having their hands available to perform other tasks. Note that in some embodiments, two nightvision systems may be used simultaneously, one for each eye, with each of the nightvision systems mounted to the helmet or other headwear. As will be readily appreciated, a mounting for a nightvision system used for a right eye will be different than a mounting for a nightvision system used for a left eye, or for a weapon mount of a nightvision system. Thus, to maintain a certain orientation of text displayed by the display unit 218, embodiments may allow the display unit 218 to be oriented in various different orientations within the housing 224 of the nightvision system 200. This is facilitated by the concentric conductors 244 and 246 on the interposer 240 along with the arrangement of the power pins 234 on the display unit 218. Note that several different orientations may be used for the nightvision system including various different orientations for left and/or right eyes, weapon mount orientations, or other orientations.

Figure 13:
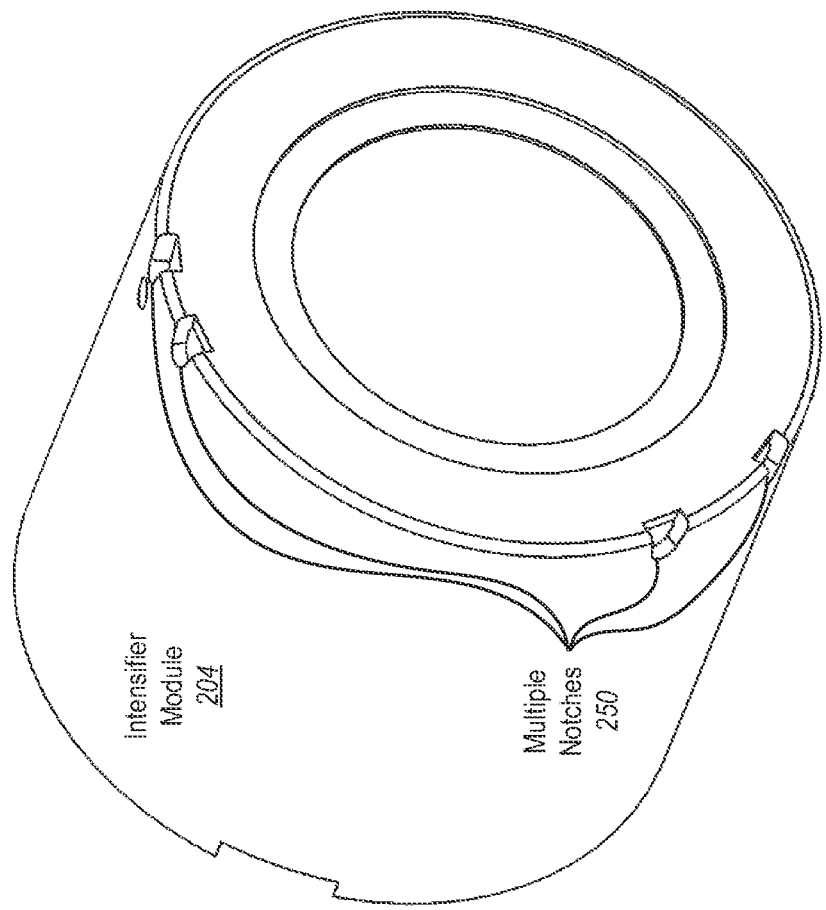
FIG. 13 illustrates implementing multiple alignment notches in an intensifier module.
Figure 14:
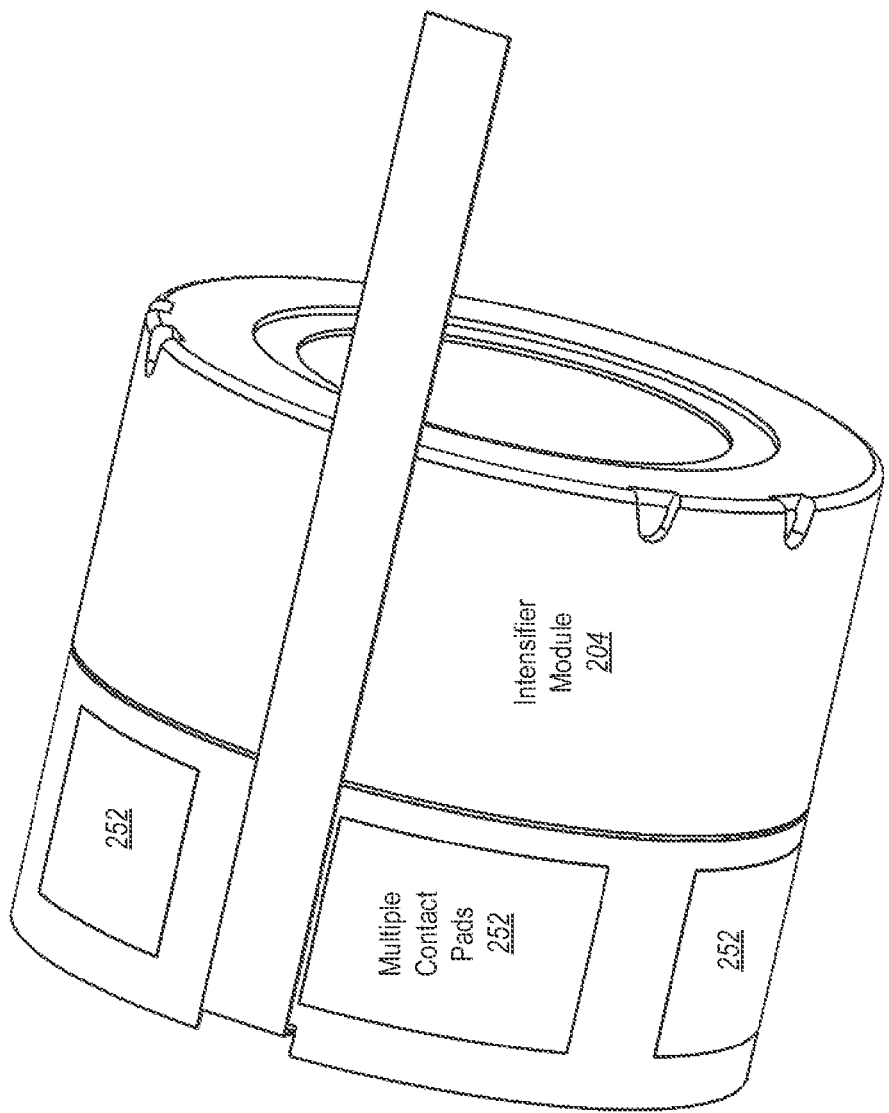
FIG. 14 illustrates the use of multiple contact pads on an interposer used on an intensifier module, or as an integral part of the intensifier module housing.

Note that various other aspects of certain embodiments may be configured in fashions to allow for multiple different orientations of the display unit 218. For example, as illustrated in FIG. 11, a notch 248 is illustrated. This notch is configured to engage with a pin within the housing 224 of the nightvision system 200 to keep the intensifier module 204 in a particular orientation. However, to support multiple different orientations, some embodiments include multiple notches 250 illustrated in FIG. 13. This allows the intensifier module 204 to be oriented in a number of different distinct orientations within the housing 224 of the nightvision system 200. Alternatively or additionally, as illustrated in FIG. 14, some embodiments may include multiple contact pads 252 or larger sized contact pads to allow for the intensifier module 204 to be implemented in various orientations within the housing 224 of the nightvision system 200.

As discussed previously herein, it is desirable to maintain original functionality aspects of the nightvision system 200 when adding an aftermarket display unit 218. One such feature relates to a low battery indicator included in the nightvision system 200. In particular, FIG. 3 illustrates a red LED 254 included on a circuit board in the battery assembly 226. This LED 254 will illuminate when a battery in the battery assembly 226 has discharged below a certain point. A second LED is also visible (although, not in the illustrated figure) that indicates that an IR illuminator is on. Previously, these LEDs would be visible to the user by the LED emitting light through a light pipe that would direct the light to the eyepiece 222 to allow the user to see the illumination of the LED 254. However, adding the display unit 218 may prevent this light from the LED 254 from being seen by the user for a number of different reasons. For example, in some embodiments, the light pipe previously used to transmit the light takes up valuable space that is needed to install the display unit 218. As such, in some embodiments, this light pipe is removed to make space for the display unit 218. Alternatively, or additionally, the display unit 218 may block light emitted from the LED 254.

As noted above, the clear plastic lightpipe component in production today operates by reflecting light. However, it takes up a valuable 0.031" of space on top of the face of the intensifier module 204. Since the display units must rotate to match J-arm position, the lightpipe functionality must also follow. In order to match 2 LED's in 3 different orientations would require 6 discrete lightpipe locations. But, in order for a display and electronics to be implemented within this same volume, the lightpipes would greatly interfere with the space available—to the point where the display unit may no longer be viable as electronic components cannot be made to fit.

The display unit optics are important to the function of the display unit. The current modules produced have a 0.022" gap between the face of the module and the face of the housing. The lightpipe is 0.031" tall. If the same design were used, 0.051" of about a total available space of 0.26" would be lost. Practically, it may be advantageous to only use about 0.20" total height to allow for some eyepiece diopter adjustment, so about 20-25% of the available space would be consumed by the traditional lightpipe design.

Figure 15A:
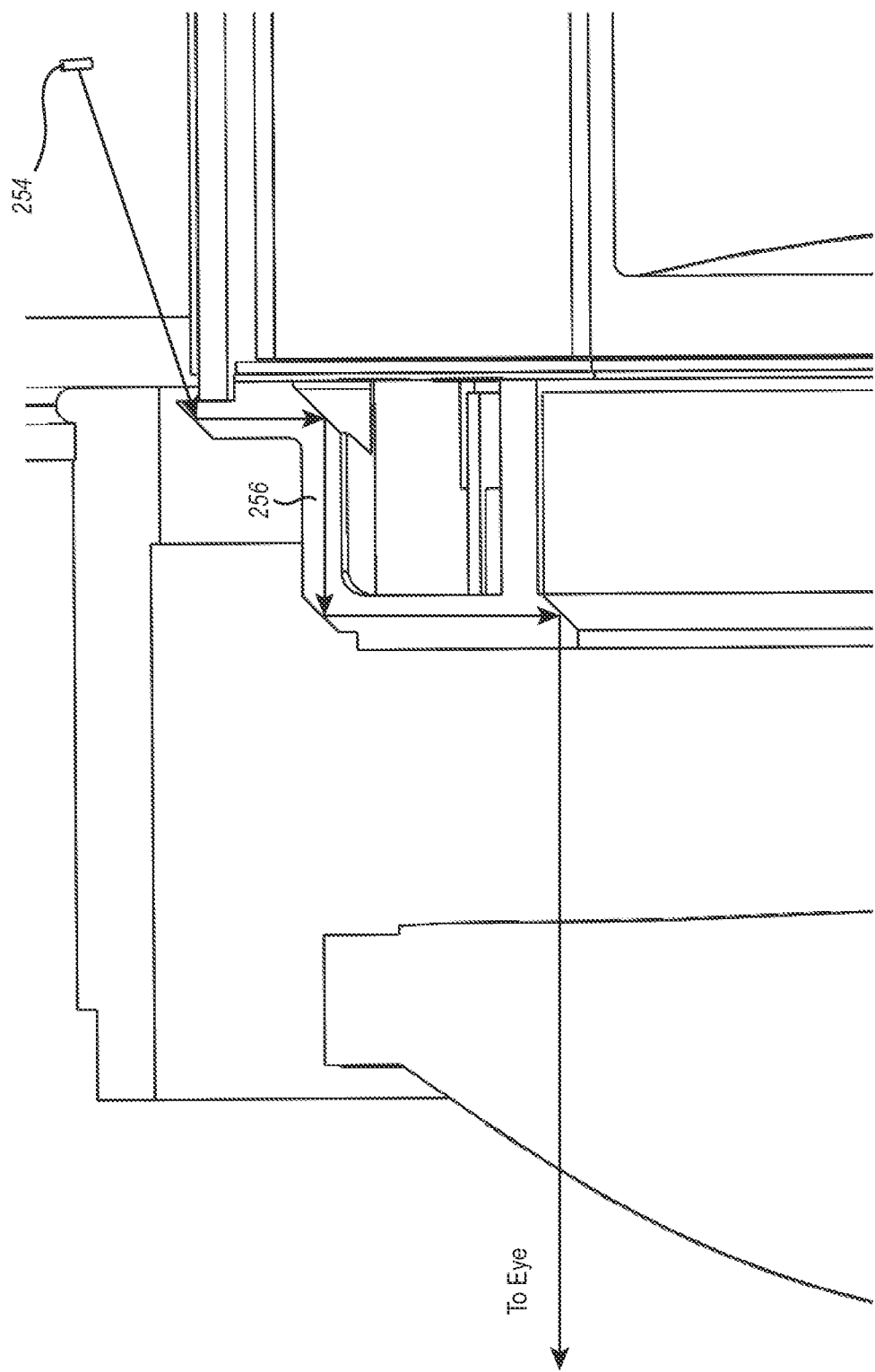
FIG. 15A illustrates using a light pipe to transmit LED light on a system board of a nightvision system to a user.
Figure 15B:
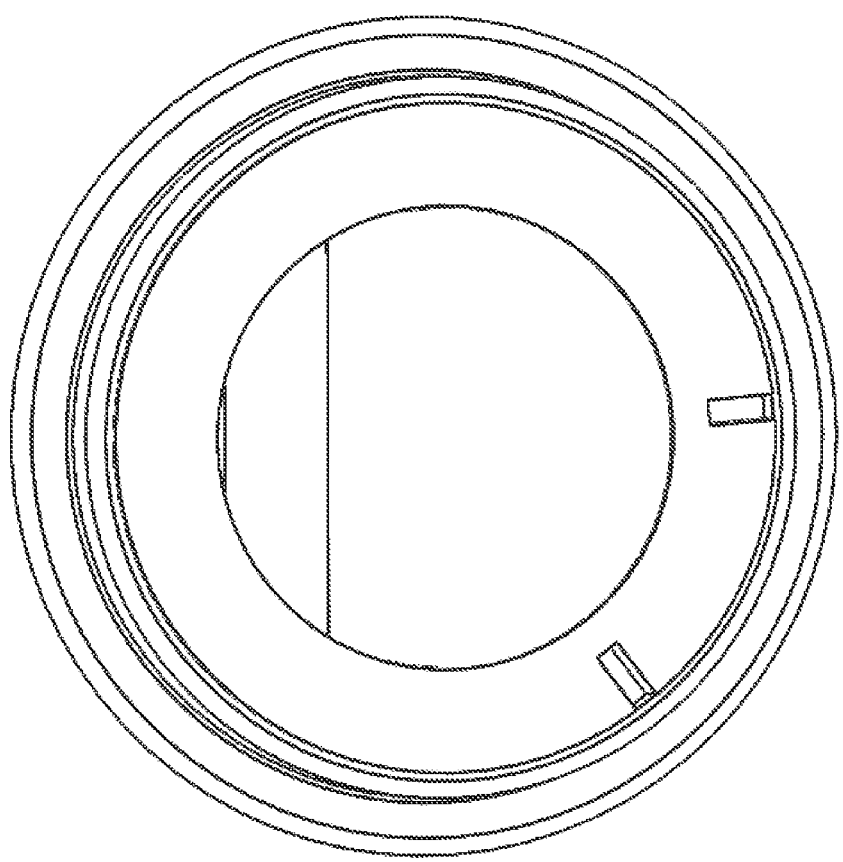
FIG. 15B illustrates a view of a display unit incorporating the light pipe.

Some embodiments illustrated herein pipe light in from the same location as current production lightpipes, but reflect the light internally to the design of the display housing in a zigzag pattern, as illustrated in FIG. 15A, exiting the top of the housing. This allows use of the 0.051" for circuit board and display height while retaining the lightpipe features. An example of a display unit with integrated lightpipe to accomplish this functionality is illustrated in FIG. 15B.

Thus, embodiments may include features to allow low battery indications to be provided to the user. As noted, in some embodiments, this may be accomplished by certain aspects related to the construction of the display unit 218. For example, as discussed above, in some embodiments, the display unit 218 may have an integrated light pipe that routes light from the LED 254 (or from the other un-shown LED) around the opaque components in the display unit 218 to allow the light to once again reach the eyepiece 222 such that the user can view the light from the LED 254.

An example of this is illustrated in FIG. 15A which illustrates the LED 254 and a light pipe 256 included as part of the display unit 218. As illustrated in FIG. 15, light from the LED is routed around opaque components of the display unit 218 to enable transmission of the light to the user's eye.

Figure 16:
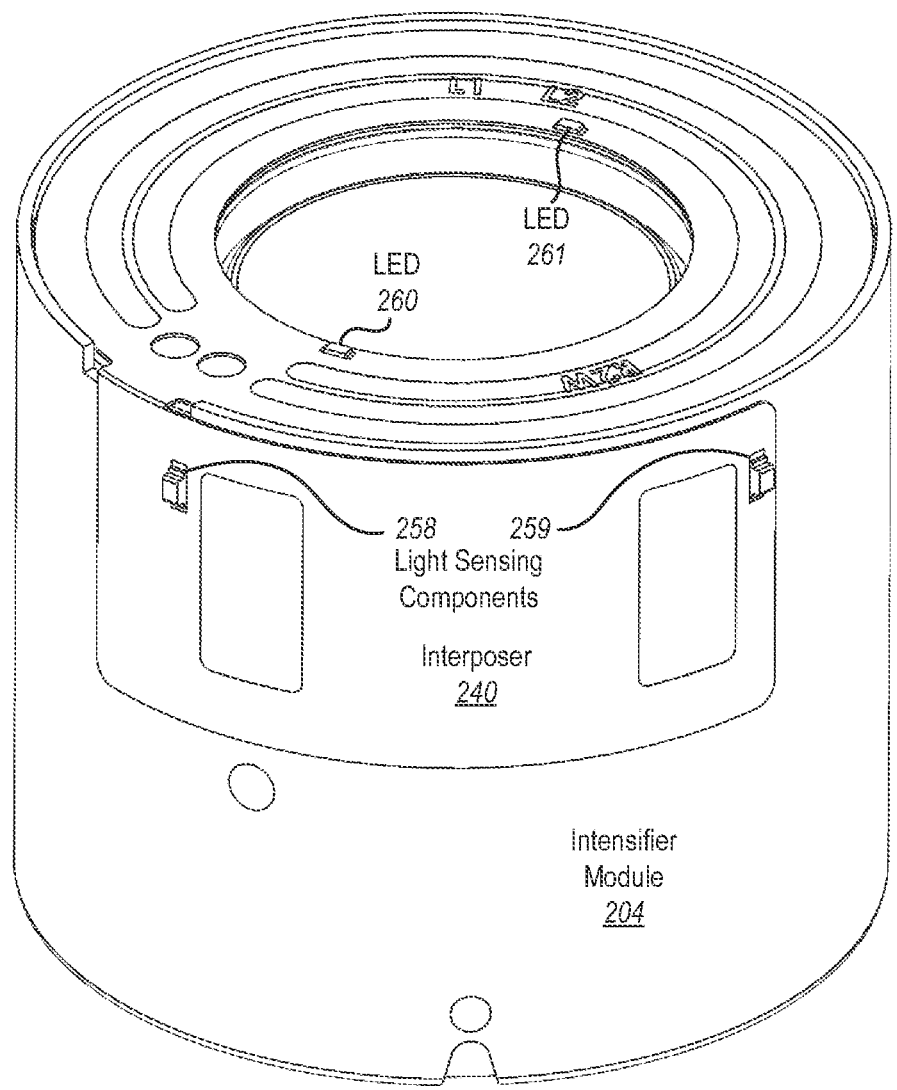
FIG. 16 illustrates the use of light sensing components and LEDs to indicate when LEDs on a system board of a nightvision system are illuminated.

An alternative solution is illustrated in FIG. 16. In the example illustrated in FIG. 16, light sensing components 258 and 259 are illustrated. For example, the light sensing components 258 and 259 may be photodiodes, photodetectors, or other light-sensitive components. The light sensing components 258 and 259 are illustrated as being implemented on the interposer 240. The light sensing components 258 can sense light from the LED 254 and/or an IR illuminator flashlight indicator LED. When light is sensed by the light sensing components 258, circuitry can cause light to be emitted from an LED 260 and/or LED 261. The LED 260 and/or 261 are on the output side of the intensifier module 204 such that the light is then visible to the user by being transmitted through the eyepiece 222. This allows the user to determine when batteries in the nightvision system 200 are below a certain level and need to be recharged and/or when an IR illuminator flashlight is broadcasting light. In some embodiments, one of the LEDs and light sensing components may be for indicating low battery and the other LED and light sensing component may be for indicating that the IR illuminator flashlight is illuminated.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of upgrading an existing nightvision system device, the method comprising:
   modifying the existing nightvision system device by at least one of removing one or more components on an output side of an intensifier module or by modifying a housing of the existing nightvision system device to create available internal space in the nightvision system device at the output side of the intensifier module; and
   optically coupling a display unit to the output side of the intensifier module of the nightvision system by utilizing the available internal space, the display unit configured to display graphical content in a field of view together with nightvision images from an output of the intensifier module of the nightvision system.

2. The method of claim 1, further comprising removing an existing lightpipe for transmitting light from one or more internal light emitters from the nightvision system to make room for the display unit in the night vision system.

3. The method of claim 2, further comprising replacing the existing lightpipe with a lightpipe integrated into the display unit configured to route light from the one or more internal light emitters around opaque portions of the display unit.

4. The method of claim 2, further comprising replacing the existing lightpipe with one or more light detectors configured to detect the light emitted from the one or more internal lights and one or more light emitters configured to emit light when light is detected from the one or more internal lights.

5. The method of claim 1, further comprising electrically coupling one or more power pads on the intensifier module to power inputs for the display unit.

6. The method of claim 1, further comprising creating additional space inside of the nightvision system by performing at least one of supplying a larger housing, unscrewing of an eyepiece, adding a diopter extension element, adding an eyepiece extension element, or, physically limiting an amount of adjustments that can be made to a diopter, adding a diopter extension tube.

7. The method of claim 1, further comprising replacing a flex tail in the nightvision system with a new flex tail including at least one of GPS components, wireless communication components, Wi-Fi components, encrypted Wi-Fi components, an Inertia Measurement Unit, a compass unit, or an infrared device.

8. The method of claim 1, further comprising integrating the display unit into a housing of the intensifier module.

9. A modified nightvision system comprising:
an intensifier module configured to intensify received light input into the intensifier module, the intensifier module having an input side configured to receive photons of the received light and an output side configured to output intensified light resulting from the received light;
a display unit proximate the output side of the intensifier module, the display unit configured to output graphical content;
a beam combiner optically coupled to the display unit and the output side of the intensifier module, and configured to combine the intensified light and graphical content;
an eyepiece optically coupled to the beam combiner, and configured to receive the combined intensified light and graphical content and to provide the combined intensified light and graphical content to a user;
wherein the nightvision system is modified by at least one of removing one or more components on an output side of the intensifier module or by modifying a housing of the existing nightvision system to create available internal space in the nightvision system at the output side of the intensifier module to allow for the display unit and beam combiner to be added to the nightvision system by utilizing the available internal space.

10. The nightvision system of claim 9, wherein the nightvision system is configured to display the intensified light and graphical content to the user at a same focal distance.

11. The nightvision system of claim 9, further comprising an interposer electrically coupled to the intensifier module and the display unit such that the display unit is powered by parasitically obtaining power provided to the intensifier module.

12. The nightvision system of claim 11, wherein the interposer comprises concentric arc shaped electrical traces for providing power to the display unit, and the display unit comprises contacts configured to connect to the concentric arc shaped electrical traces in a plurality of orientations for the display unit with respect to the intensifier module.

13. The nightvision system of claim 9, wherein the display unit is configured to cause the graphical content to be displayed offset from a center of the intensified light.

14. The nightvision system of claim 9, wherein the intensifier module comprises a plurality of orientation notches to allow the intensifier module to be implemented in the nightvision system in a plurality of orientations.

15. The nightvision system of claim 9, wherein the intensifier module comprises a plurality of electrical pads configured to allow the intensifier module to be implemented in the nightvision system in a plurality of orientations.

16. The nightvision system of claim 9, wherein the intensifier module comprises at least one electrical pad configured in size and shape to allow the intensifier module to be implemented in the nightvision system in a plurality of orientations.

17. The nightvision system of claim 9, further comprising a light pipe configured to transmit light from one or more indicator lights internal to the nightvision system around the display unit, to cause the transmitted light to be provided to the user at the eyepiece.

18. The nightvision system of claim 9, further comprising:
a light detector configured to detect one or more indicator lights internal to the nightvision system; and
a light source configured to transmit light to the user at the eyepiece when the light detector detects the one or more indicator lights.

19. The nightvision system of claim 9, further comprising an inertial measurement sensor used to detect and orient the nightvision system, wherein the orientation of the nightvision system is used to determine an orientation for the graphical content.

20. The nightvision system of claim 9, further comprising an accelerometer configured to detect impacts to the nightvision system, wherein the impacts can be used to control the graphical content.

21. A method of using a modified nightvision system, the method comprising:
receiving input light at an input side of an intensifier module;
intensifying the received light input into the intensifier module;
outputting, at an output side of the intensifier module, the intensified light resulting from the received input light;
displaying graphical content at a display unit proximate the output side of the intensifier module, the display unit having been added to the modified nightvision system that has been modified to allow of the display unit to be added by at least one of removing one or more components on an output side of the intensifier module or by modifying a housing of the nightvision system to create available internal space in the nightvision system at the output side of the intensifier module to allow for the display unit and a beam combiner to be added to the nightvision system by utilizing the available internal space;
combining the intensified light and graphical content at the beam combiner; and
providing the combined intensified light and graphical content to an eyepiece to provide the combined intensified light and graphical content to a user.

22. The method of claim 21 wherein the method is performed such that the graphical content and intensified light are at the same focal distance.

* * * * *